United States Patent Office 3,008,595
Patented Nov. 14, 1961

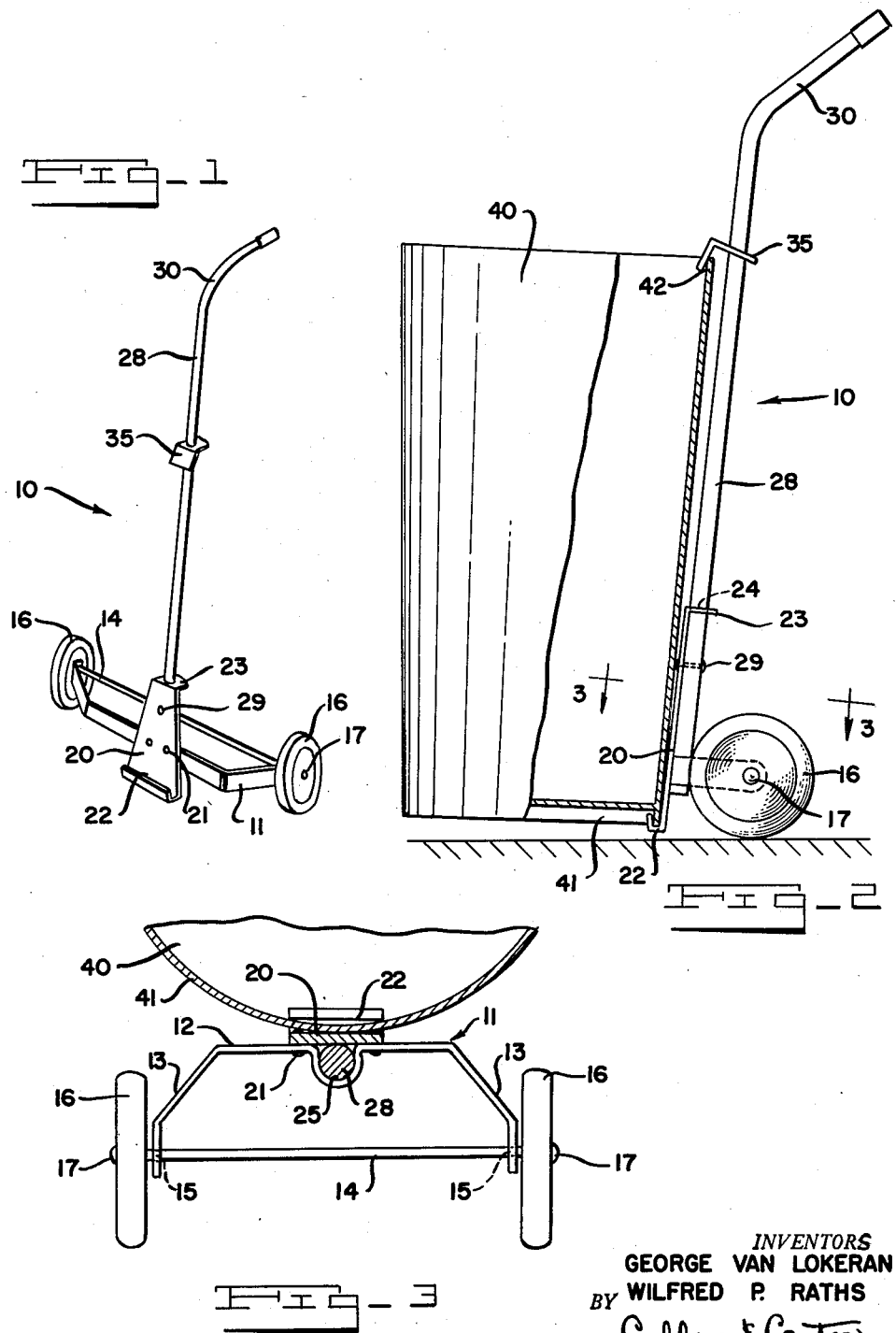

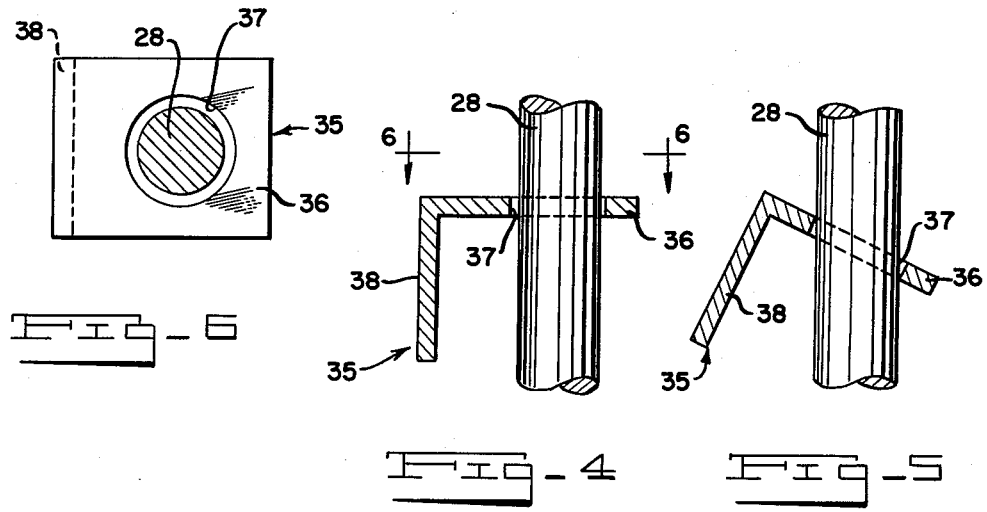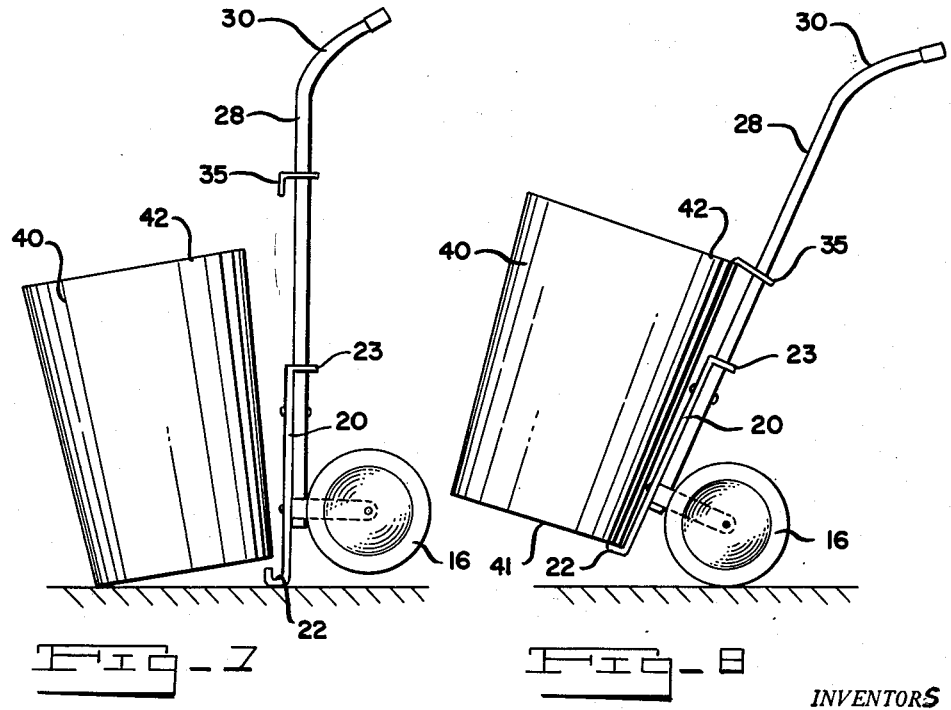

3,008,595
CART FOR CARRYING CONTAINERS
George Van Lokeran, 725 Grand Maries, Grosse Pointe, Mich., and Wilfred P. Raths, 1510 McClellan, Detroit, Mich.
Filed Sept. 14, 1959, Ser. No. 839,953
1 Claim. (Cl. 214—383)

This invention relates to a cart for carrying containers and more particularly to a cart arranged to pick up and carry garbage cans and the like type of containers which have bottom depending flanges or lips and top open mouths or lips.

As is well known, garbage cans and the like type of containers frequently are stored in one place and have to be regularly moved to another place such as to a front sidewalk where the garbage may be picked up by a garbage truck. Moving these containers, particularly when loaded, is a difficult job for the average person and particularly for the average householder. While various large size carts are available upon which cans may be stored and moved, these carts are generally quite expensive and are bulky and cumbersome to store and use.

Thus, it is an object of this invention, to form a cart which is extremely simple in construction, extremely inexpensive, which can be easily stored and because of its light weight, easily lifted and moved even by a housewife and which is suited to carry containers, one at a time, from one place to another without the necessity of manually lifting the containers at any time other than to tip them slightly in order to secure them to the cart.

A further object of this invention is to form a cart out of a few simple parts which cart is provided with a bottom channel which receives the bottom lip of the ordinary garbage can or the like type of container and which has a simple locking means which locks against the top of the container such as against the top lip thereof simply by lifting the locking means and dropping it in place and relying upon friction to do the actual locking.

These and other objects and advantages of this invention will become apparent upon reading the following description of which the attached drawings form a part.

In these drawings:

FIG. 1 is a perspective view of the cart, per se.

FIG. 2 is a side elevational view of the cart with a large size container, shown in cross-section, secured to the cart.

FIG. 3 is a cross-sectional view taken in the direction of arrows 3—3 of FIG. 2.

FIG. 4 is an enlarged view of the locking means.

FIG. 5 shows the locking means in cross-section and cocked at an angle so as to lock against the handle pole.

FIG. 6 is a cross-sectional view taken in the direction of arrows 6—6 of FIG. 4.

FIGS. 7 and 8 show the cart in its non-use standing position and in its use, tilted position, respectively.

Referring to the drawings, the cart herein is generally designated as 10. As shown in FIG. 3, the cart includes a strip 11 formed out of rigid material such as aluminum or steel which strip is normally located in a substantially horizontal plane and which has a center portion 12 and end portions 13 bent back from the center portions.

A shaft 14 extends between the two end portions and is journaled through apertures 15 formed in each of the end portions. A wheel 16 is secured upon each end of the shaft and the free ends of the wheels may be covered by friction type caps 17 which are conventional and are widely used for wagons, bicycles and other type toys and articles. Thus, it can be seen that the wheels are fixed to the axle and the axle is rotatably mounted within their journals or openings 15 in the end portions of the strip. Of course, the axle could be fixed, if desired, with the wheels being rotatable upon the axles without affecting the invention hereof.

A plate 20 is secured to the front of the center portion of the strip by means of rivets or bolts and nuts 21. The plate is of a size so that its bottom end extends downwardly to touch ground and thus form a three point support for the cart, the support being the bottom edge of the plate and the two wheels. In this position, the plate is tilted at a slight angle to the vertical as shown in FIG. 2.

The bottom edge of the plate is bent upwardly and outwardly to form an upwardly opening channel 22. This channel is arranged to receive the bottom lip of a container as will be described below. The upper end of the plate is extended above the height of the strip a considerable distance and is bent into a flange 23 provided with an opening 24.

The center of the strip 11 is bent to form a loop or socket 25 within which the bottom end of a handle pole 28 is inserted. As shown in FIG. 3, the pole is held within the loop, which is open, by the plate engaging the bottom of the pole as well as the pole fitting in the loop. In addition, the pole is snugly fitted through the opening 24 and may further be riveted or bolted at 29 to the plate.

As can be seen, the handle pole extends upwardly a considerable distance and may have its upper end 30 bent backwards to form a grasping portion.

To releasably lock the top of a container to the pole, a locking attachment 35 is provided (see FIGS. 4, 5 and 6). This attachment is formed as a right angle having one leg 36 formed with an opening 37 which is of considerably greater size than the cross-sectional dimension of the handle pole. The other leg 38 depends downwardly. Ordinarily the attachment as shown in FIG. 4 can be slid upwards and downwardly upon the handle because of the difference in size between the opening 37 and the diameter of the handle. Note, that the handle is of a uniform cross-section throughout its length to permit this easy sliding.

When the leg 38 engages over the top edge or top lip of a container, the container tends to tip away from the handle because of its weight and thus dislocates the leg 38 from a vertical position into a cocked position (see FIG. 5) wherein the opening 37 is no longer coaxial with the handle but rather is tipped relative to the handle and thus the edges defining the opening lock against the handle to frictionally lock the handle against the attachment and prevent the attachment from further sliding.

This cart is designed for use in picking up and carrying a container 40 which is formed with a bottom depending flange 41 and a top edge or lip 42. Containers of this type are quite conventional and are frequently used for garbage containers as well as for other purposes.

In operation, the cart is normally stored with its wheels and the bottom edge of its plate engaging the ground. When it is desired to connect a container to the cart, the cart is rolled to the side of the container and then the handle is pushed forwardly so that the bottom edge of the plate remains upon the ground but the wheels are lifted above the ground (see FIG. 7). In this position, the user tips the container top backwardly slightly so that its bottom flange 41 clears the ground and may be slipped into the channel 22. With the cart still in this position, the user may lift the attachment 35 above the level of the top of the container and then simply drop it so that its leg 38 engages over the top edge 42 of the container.

Next, by simply grasping the handle and tipping the container back (see FIG. 8), the cart is supported only upon its two wheels and the bottom edge of the plate clears the ground. In this position, the container is tipped back with the cart but because of the container's center of gravity is considerably in front of the cart, the container top tends to tilt away from the handle and the attachment 35. When this happens, the attachment cocks at an angle relative to the handle and locks to the handle as was described above. Whereupon, the user may simply wheel the cart with the container to any place that he wishes and then reverse the procedure to disconnect the container from the cart.

It can be seen, because of its minimum number of parts, and because of the simple construction of the parts, the cart may be extremely inexpensive and extremely light weight so that it is well within the budget of any ordinary householder and may be easily used even by a woman. Also it is adapted to carry a wide range of sizes and shapes of containers.

This invention may be further developed within the scope of the following attached claim. Accordingly, it is desired that the foregoing description be read as being merely illustrative of an operative embodiment of this invention and not in a strictly limiting sense.

We now claim:

A cart for carrying containers and the like of the type having a bottom depending lip, said cart comprising a normally horizontally arranged, thin, narrow, rigid strip having a center portion formed with a flat front face and end portions, the end portions being bent backwardly from the center portion and each being provided with a wheel rotatably attached thereto, the center part of the center portion being bent backwardly into a continuous, substantially cylindrically shaped loop having an upright axis, the loop being open at the front face of the strip and closed at the rear face of the strip; a substantially vertically arranged, narrow, thin, rigid, flat plate having a rear face arranged transversely to and in face to face contact with the front face of the strip center portion and covering the front face opening of the loop to form an annular socket for receiving and completely surrounding the end of a pole, the plate being secured to the strip on opposite sides of the loop and extending a considerable distance above and below the strip, the bottom edge of the plate being bent forwardly and upwardly to form, with the adjacent portion of the front face of the plate, an upwardly opening channel located below the strip and in front of the front face of the strip; and an elongated handle pole having its bottom end snugly fitted into the loop and being completely enclosed within said socket and being in line contact with the rear face of the plate from the bottom of the loop to the top of the plate and being clamped in the loop by the plate portion covering said opening in the loop and also being secured to the plate at the top of the plate; and releasable locking means on the handle pole normally located considerably above the loop for releasably locking the top of a container to the handle pole.

References Cited in the file of this patent

UNITED STATES PATENTS

| | | |
|---|---|---|
| 483,006 | Nichless | Sept. 20, 1892 |
| 551,983 | Merritt | Dec. 24, 1895 |
| 593,226 | MacPhail | Nov. 9, 1897 |
| 2,417,918 | Fatur | Mar. 25, 1947 |
| 2,639,163 | Walker | May 19, 1953 |
| 2,717,706 | Yow et al. | Sept. 13, 1955 |
| 2,764,420 | Morrissy | Sept. 25, 1956 |
| 2,808,163 | Petzke | Oct. 1, 1957 |
| 2,851,180 | McCabe | Sept. 9, 1958 |